United States Patent [19]

Fraser

[11] Patent Number: 4,720,423
[45] Date of Patent: Jan. 19, 1988

[54] PACKAGE OPENING SYSTEM

[75] Inventor: Andrew D. Fraser, Afton, Minn.

[73] Assignee: Minnesota Mining and Manufacturing Company, St. Paul, Minn.

[21] Appl. No.: 899,807

[22] Filed: Aug. 25, 1986

[51] Int. Cl.$^4$ .................. B32B 5/16; B32B 29/04
[52] U.S. Cl. .................. 428/313.5; 428/905; 428/323; 428/313.3; 428/40; 428/906; 428/35; 428/43; 428/916
[58] Field of Search .................. 428/905, 323, 313.5, 428/313.3, 40, 906, 35, 43, 916; 206/242, 247, 605, 216

[56] References Cited

U.S. PATENT DOCUMENTS

| | | | |
|---|---|---|---|
| 3,685,734 | 8/1972 | Paciorek et al. | 428/905 X |
| 3,896,965 | 7/1975 | Cornell | 220/359 |
| 4,105,144 | 8/1978 | Lin | 206/205 X |
| 4,111,462 | 9/1978 | Lange et al. | 282/27.5 |
| 4,186,743 | 2/1980 | Steiger | 428/905 X |
| 4,349,104 | 9/1982 | Hayes | 206/216 X |
| 4,480,760 | 11/1984 | Schonberger | 215/230 |
| 4,487,801 | 12/1984 | Turnbull et al. | 428/313.5 |
| 4,493,869 | 1/1985 | Sweeny et al. | 428/905 X |
| 4,514,461 | 4/1985 | Woo | 428/905 X |
| 4,519,515 | 5/1985 | Schonberger | 215/230 |
| 4,606,956 | 8/1986 | Charbonneau et al. | 428/905 X |
| 4,661,388 | 4/1987 | Charbonneau | 428/905 X |
| 4,666,771 | 5/1987 | Vesley et al. | 428/40 X |

FOREIGN PATENT DOCUMENTS 1329309 of 1973 United Kingdom .......... 428/905 X

Primary Examiner—George F. Lesmes
Assistant Examiner—D. R. Zirker
Attorney, Agent, or Firm—Donald M. Sell; James A. Smith; Mark A. Litman

[57] ABSTRACT

A multilayer strip having an adhesive between layers, the adhesive containing frangible microcapsules carrying a fragrant liquid therein, can be used as a tear strip for a package overwrap. Upon pulling the outward layer of said strip, the overwrap is opened and the fragrance is released.

18 Claims, 3 Drawing Figures

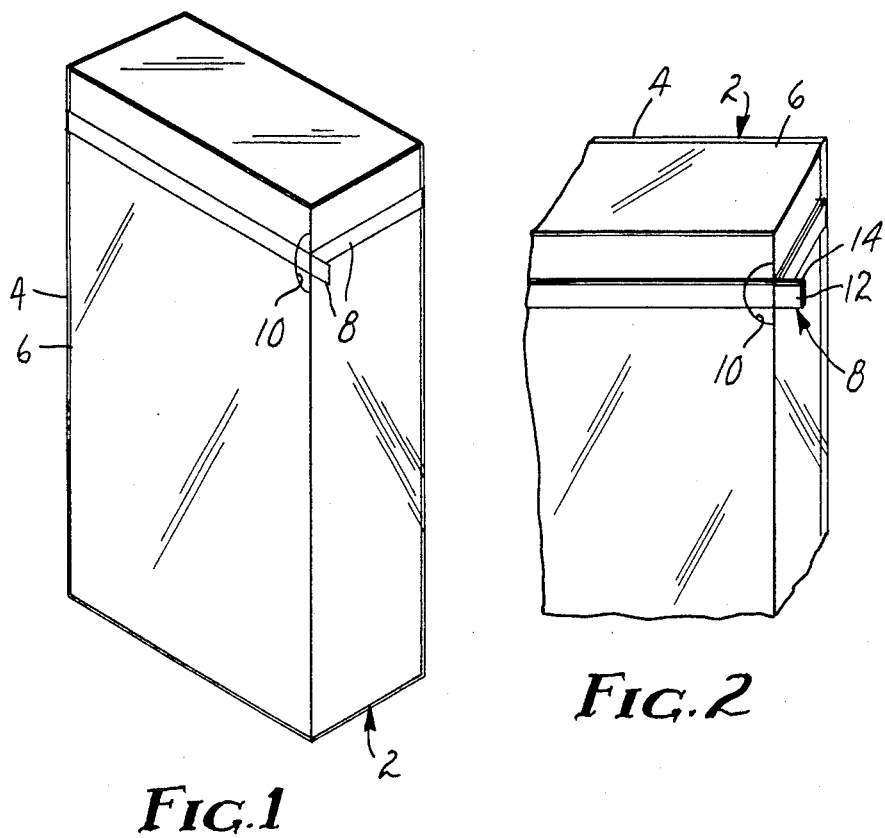
Fig.1
Fig.2
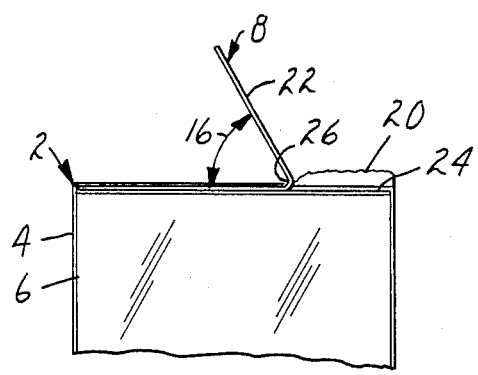
Fig.3

PACKAGE OPENING SYSTEM

BACKGROUND OF THE INVENTION

1. Field of the Invention

The present invention relates to overwraps for packages and to systems that can be used to remove or open said overwraps and release a predetermined fragrance.

2. Background of the Art

Many different types of overwrap systems are used in the packaging of goods and materials. The most common overwrap is a polymeric film which conforms to the shape of the wrapped package. The film tends to prevent the flow of air and moisture between the environment and the package, thus helping to maintain the freshness or activity of the material or article within the package. Overwraps can also serve decorative functions and can therefore be made of paper which will not provide significant protection from the environment unless coated or otherwise treated to decrease its gas permeability.

Some overwraps are intended to be opened by tearing of the overwrap material, loosening secured areas of the wrap, or breaking a precut area in the overwrap. One common form of overwrap has an exposed string or strip which extends from underneath the overwrap but above the enclosed package. As the string or strip (usually referred to as a tear strip) is pulled, usually at an angle greater than 90° from the surface of the overwrap, the tear strip will cut through the overwrap. After the strip is manipulated in this manner around the entire surface of the overwrap, a complete section of the overwrap is loosened or removed, and the package is exposed for use.

Multilayer sheet materials are known which when separated rupture microcapsules in intermediate adhesive layers and release fragrances stored within the microcapsules. Examples of such systems are shown in U.S. Pat. Nos. 4,487,801 and 4,606,956.

SUMMARY OF THE INVENTION

Overwrap sheets or films are provided with a tear strip that comprises two layers of material bound by an adhesive. The adhesive contains fragrance bearing microcapsules which are ruptured when the outer layer of the tear strip is pulled and removed from the inner layer of the tear strip. This opens the overwrap and releases the fragrance.

BRIEF DESCRIPTION OF THE DRAWINGS

FIG. 1 shows a perspective of a package 6 with an overwrap 4.

FIG. 2 shows a section on an overwrap 4 over a package 6 and shows a tear strip 8 between the package 6 and overwrap 4.

FIG. 3 shows a side view of a package 6 with overwrap 4 and a tear strip 8 which has been partially removed.

DETAILED DESCRIPTION OF THE DRAWINGS

FIG. 1 shows a combined article 2 comprising a package 6 and an overwrap 4. The article 2 has a tear strip 8 located above the package 6 and below the overwrap 4. The overwrap 4 has a notch 10 therein to facilitate initial tearing and opening of the overwrap 4 by the tear strip 8.

FIG. 2 shows a section of an article 2 having a package 6, overwrap 4 and tear strip 8. The tear strip 8 is shown to comprise two layers, an outer layer 12 in contact with or towards the overwrap 4, and an inner layer 14 in contact with or towards the package 6. There is an adhesive layer (not shown) between the two strips which bears frangible microcapsules containing fragrance therein.

FIG. 3 shows a partially opened article 2 comprising a package 6, overwrap 4 and tear strip 8. A portion 22 of the tear strip 8 has been pulled away from the package 6, and the inner layer 24 of the tear strip 8. The portion 22 constitutes a section of the outer layer of the tear strip 8. By pulling that portion 22 at an angle 16 which is perpendicular or greater than perpendicular (with respect to the surface of the package), the leading edge 26 of the portion cuts through the overwrap 4 leaving an opened portion 20 of the overwrap 4 in its wake.

DETAILED DESCRIPTION OF THE INVENTION

The use of overwraps on packages can improve the appearance and maintain the quality of the materials or article within the package. The use of a tear strip having the ability to release fragrance at the time of opening of the package can add further benefit to overwrap. The release of a controlled fragrance can give the impression to the user that the ingredients of the package are very fresh and provides a generally pleasing enhancement of the product. This is a very important marketing point with respect to consumables. The impression of the consumer that a product is fresh is enhanced by the release of fragrance at the time of first opening the overwrap to gain access to the package. This has been strongly shown in market studies.

The package may be made of any material and contain any type of article. Consumables such as candy, gum, cigarettes, dried fruit, snacks, cookies and other foods are used with particular advantage in the practice of the present invention. The package may be made of paper, cardboards, polymeric materials, coated paper, foil, composite structures, metallized paper or polymer, or any other packaging material.

The overwrap may be any tearable film or sheet material such as paper or polymeric film. Polymeric film such as polyvinylidene chloride, polyolefins, cellulose acetate (and its esters), polyamides, vinyl resins, polyesters and the like are preferred. Transparent films are generally preferred.

The layers of the tear strip may be composed of many different materials. A most important consideration of the materials with respect to the upper layer is that it must have sufficient tensile strength to be able to be pulled at an angle with respect to the package surface and tear through the overwrap without breaking. Useful materials for either or both layers of the tear strip include polymeric film, paper, foil, and fabric. The layers of the tear strip may be of the same or different material.

A wide variety of processes exist by which microcapsules can be manufactured. These varied processes provide different techniques for producing capsules of varying sizes, alternative materials for the composition of the capsule shell and various different functional materials within the shell. Some of these various processes are shown in U.S. Pat. Nos. 3,516,846; 3,516,941 and British patent specification Nos. 1,156,725;

2,041,319 and 2,048,206. A wide variety of different materials may also be used in making the capsule shells. A popular material for shell formation is the polymerization reaction product between urea and formaldehyde or malamine and formaldehyde, or the polycondensation products of monomeric or low molecular weight polymers of dimethylolurea or methylolated urea with aldehydes. A variety of capsule forming materials are disclosed, for example, in U.S. Pat. Nos. 3,516,846 and 4,087,376 and British patent specification Nos. 2,006,709 and 2,062,570.

The adhesive material for the capsules must form a bond to the coated surfaces of the sheets which is stronger than the cohesive strength of the adhesive with the capsules dispersed therein. Although it is generally desirable to have an adhesive, the absolute cohesive strength of which is less than its adhesive strength to the coated surface of the coated paper cover sheets, this is not essential. When the capsules are included within the adhesive composition, the effective cohesive strength of the adhesive tends to be reduced. Adhesives, which by themselves would cause the sheets to be damaged during separation, can be used in combination with capsules in the practice of the present invention because of lowered effective cohesive strength. The capsules in the present invention may comprise any rupturable capsule containing an active ingredient therein. The tensile rupture strength of the capsules must be such that the cohesive failure of the adhesive results in capsule breakage. It has also been found that the size of the capsules plays a role in the usefulness of capsules within rupturable sheets according to the practice of the present invention. Generally the capsules should have an average diameter between 4 and 150 microns and preferably between 12 and 50 microns when the capsule payload is between 80 and 90% by weight of the total capsule weight. It is highly preferred that the capsules have an average diameter between 14 and 26 microns and it is most preferred that the capsules have a diameter between 15 and 25 microns. These dimensions play a surprisingly important role in the ability to control the percentage of rupture of capsules in the practice of the present invention. With lower payloads (e.g., 70-80%), the capsules should be larger to provide the necessary rupture strength. The broadest range of capsule size under any conditions would be about 3 to 180 microns, with 8 micron capsules used with a 90-95% by weight payload. Six to fifty micron capsules are generally preferred.

Any adhesive capable of bonding the label to another surface may be used in the exterior surface of one of said sheets. Typically, acrylate and polyurethane pressure-sensitive adhesives are used to bond the article to another surface. Thermally softenable adhesives, such as polyolefins, polyamides, and polyesters are also particularly useful. Solvent-activatable adhesives (including water-activatable adhesives) such as poly(vinyl alcohol), natural gums, acrylates and polyesters are also very useful. Thus pressure-sensitive, heat activatable, or solvent activatable adhesive can be used, as well as permanent adhesives coated on the exterior surface immediately before application of the fragrance emitting device. The fragrance releasing strip may also be otherwise secured into the package and wrapping. For example, a one- or two-side coated adhesive tape may be placed between the strip and the package. A one-sided tape would adhere the inward facing layer to the wrapping material so that when the upper part of the element is pulled, the lower layer is restrained by its securement to the wrapping. A two-sided adhesive tape would secure the lower layer to the package or to the package and wrapper depending upon its width.

It is preferred that the tear strip comprise:
(1) at least two sheets bound by an adhesive composition layer,
(2) said adhesive composition layer containing microcapsules with said liquid within the shell of said microcapsules, and
(3) said microcapsules having an average diameter between 4 and 80 micrometers, the cohesive strength of the adhesive composition layer being less than the strength of the bond between said adhesive composition and a face of said sheets, the tensile rupture strength of said microcapsules being less than the cohesive strength of the adhesive composition, and the rupture force of said adhesive composition layer containing microcapsules at 50% relative humidity being between at least 1 ounce per linear five-and-one-half inches and less than 45 ounces per linear five-and-one-half inches (greater than 2.0 g/cm and less than 90 g/cm), at least one exterior surface of a sheet having an adhesive thereon. It is preferred that the rupture strength between the sheets exceeds 8.0 g/cm and is less than 80 g/cm and most preferably exceeds 16 g/cm and is less than 75 g/cm. The minimum strength at this ambient condition (e.g., 20° C. and 50% R.H.) is necessary to keep the sheets from falling apart from forces incurred during handling. This problem has frequently occurred in magazine inserts where coated paper was used. The maximum limit on the rupture strength is necessary to keep the paper from tearing (termed fiber pull or fiber rupture) before the adhesive and capsules rupture. This would prevent release of the liquid from the capsules. The adhesive strength of the exterior adhesive to substrates (especially printed coated paper) is preferably greater than the cohesive strength of the adhesive layer containing microcapsules. Preferably, it is at least 10% greater in adherence than the rupture strength between the sheets. This type of article is generally applied to paper surfaces (and especially coated paper surfaces) and so it is preferred that the strength of adherence of the exterior adhesive to paper is at least 10% greater than the rupture strength between the sheets. A "liquid" according to the present invention includes liquids with materials dissolved or dispersed therein (e.g., pigments) and gels which are capable of flowing under moderate pressure.

It is also desirable to have the construction resist the effects of variable ambient conditions. It is therefore desirable that rupture strength exceed 4.0 g/cm after storage at 120° C. and less than 1% R.H. for seventy-two hours. This test would be performed by storage in an oven, removal to a neutral environment (e.g., sealed bag or jar) until the article is at room temperature, and then measuring the rupture strength. It is preferred that the rupture strength is at least 8.0 g/cm and most preferred that the rupture strength is at least 16 g/cm under those conditions. The article must still display a rupture strength between 2 and 90 g/cm at 20° and 50% R.H.

A number of methods have been found which enable these conditions to be met according to the present invention. The use of viscosity increasing agents in the binder provides a more even coating and one that ruptures before fiber pull begins. The use of additional coatings over the coated paper which contain polymers different from the binder of the adhesive layer and which do not form a solution or chemically bond to the binder of the adhesive layer provides a useful article according to the present invention. The use of larger size capsules tends to weaken the cohesive strength of the adhesive composite and prevent fiber pull. The use of capsules which are not moisture sensitive in combination with these large capsules (e.g., greater than 30 microns and up to 95 microns) provides a useful adhesive layer. Higher capsule-to-binder ratios reduce the cohesive strength of the adhesive, as does the addition of non-viscosity enhancing particulate fillers.

According to the preferred practice of the present invention, if the method uses coated paper surfaces, the binder between the sheets contains viscosity increasers (viscofiers) in addition to the microcapsules. The use of viscofiers reduced the criticality of proportions of materials and provided increased coating and manufacturing latitude. Viscosity enhancers or viscosity increasing agents are well known in the art. Any material which when present in the coating solution in an amount not greater than 10% by weight increases the viscosity by at least 5% is a viscofier according to the present invention. Preferably viscosity is increased by at least 20%. They are either inorganic particulate materials (e.g., silica, amorphous silica, bentonite clay, montmorillonite clay, etc.) or organic particulate or soluble materials (e.g., water softenable acrylic particles, water swellable poly(methylmethacrylate), water soluble or organic solvent soluble polymers, etc.). The inorganic particles tend to be preferred. The viscofiers enhancers have been found to be necessary in dry weight proportions of the adhesive mix in amounts of from 0.25 to 12% by weight, preferably from 5 to 12% by weight. In general, the weight proportions of materials in the dried adhesive layers according to the present invention are generally as follows:

| Microcapsules | 21–80% |
| Adhesive | 19.75–70% |
| Viscosity Enhancers | 0.25–12% |

Other optional ingredients such as surfactants, coating aids and the like may be present. Preferred proportions of these ingredients are:

| Microcapsules | 44.5–80% |
| Adhesive | 19.5–55% |
| Viscosity Enhancers | 0.5–10% |

The ability to use coated paper in the manufacture of these articles is important because those materials are the standard printing medium of the trade. Both one-side coated paper and two-side coated paper are useful. Those papers enable highest quality printings to be made in combination with the releasable materials of the present invention.

The nature and composition of the adhesive binder is not critical to the practice of the invention as long as the required adhesive and cohesive properties are met. The adhesive may be pressure sensitive, water or solvent soluble or thermally activatable. A single layer of a non-pressure-sensitive adhesive is preferred. There is no need for rejoining the sheets after rupturing of the capsules and so the pressure sensitive function is not necessary.

The adhesive (with microcapsules) may be applied between two separate sheets in either continuous or discontinuous patterns. It is usually desirable to leave at least some portion of at least one outer edge of the sheets unbonded so as to provide an area where separation can be easily started. A single sheet may be folded so as to form two facing sheets joined along one edge. The adhesive may be applied on the interior area adjacent the fold. This provides a folded article that can be readily opened, rupturing the capsules, yet leaves a single artifact rather than two sheets after us.

It is preferred that the capsule-bearing adhesive coated inside portion between the sheets constitute from 60 to 95% of the surface area of the sheets. In two sheet constructions, 10 to 95 percent adhesive coverage can be used to leave an edge or corner that can be readily grasped to pull one sheet from another. Some uses may allow for only a single corner to be uncoated so as to provide a starting point for the separation of the sheets, but the 60 to 95% range is preferred with 70 to 90% preferred in two sheet constructions.

The tear strip may be partially separated at the end extending from beneath the overwrap. The inner layer may be held down while the upper layer is peeled away. The side of the inner layer adjacent the package may also be adhered to the surface of the package. The upper layer of the tear strip may then be more easily peeled away. The facilitate this removal, the adherence of the inner layer of the tape should be greater than the rupture strength of the two layers of the tear strip. The adhesive securement to the package may be by pressure-sensitive adhesive, solvent based adhesive, or thermally softenable adhesive.

Any class of adhesives including but not limited to polyurethanes, polyacrylates, polyvinyl resins (e.g., polyvinyl alcohol, polyvinyl chloride), polyamides, polyesters, polyolefins, starches, gum arabic, gelatin and the like may be readily used in the practice of the present invention. Washing of the capsules before mixing them with the adhesive often tends to provide more consistency in their properties by removing low molecular weight, unreacted materials.

Any fragrance may be chosen to be included within the capsules. The fragrance should be chosen to enhance or blend with the fragrance of the package ingredients. For example, mint aroma could be used with a package of chocolate mints, menthol with menthol cigarettes, cinnamon with cinnamon toast, sandalwood with soap, and the like.

EXAMPLE 1

Two sheets of $7.6 \times 10^{-5}$ m polyester film were adhered together by an adhesive composition comprising 64% by weight of microcapsules, 24.5% by weight of polyvinyl alcohol (Gelvatol® 40-10), 10.5% by weight polyvinyl alcohol (Gelvatol® 20-60), and 1% glycerin in water. The capsules were prepared from menthol oil in urea-aldehyde microcapsules according to Example 10 of U.S. Pat. No. 3,516,941. The adhesive was coated at a weight of 1.6 kg per 110 m². After drying, strips of 2 mm widths were cut from the sheet. These strips were used in place of single sheet tear strips on packages of mentholated cigarettes. A coating of pressure-sensitive adhesive was placed on the cigarette box in the region where the tear strip was to be applied, prior to packaging with a cellophane overwrap.

After wrapping with cellophane, the upper layer of the tear strip was pulled. The tear strip cut through the overwrap and a strong aroma of menthol was released.

EXAMPLE 2

A square segment of the material of Example 1 (2×2 cm) was cut from the adhered sheets. A small slice was made between one edge to enable a single sheet to be grasped and a pressure-sensitive adhesive coated on one side of the sheet. A foil overwrapped box of dishwashing detergent was obtained and a small slit made in the foil over the pour spout. The square segment was inserted part way into the slit, the adhesive coated face towards the spout. The upper sheet was grasped and pulled. The upper sheet tore through the foil unwrapped and a strong fragrance of menthol was produced.

EXAMPLE 3

A sheet was prepared identically as described in Example 1 except that one edge of the upper sheet extended beyond an edge of the lower sheet. A segment of this sheet including the overlapping edge was cut out. A pressure-sensitive adhesive was placed on the exterior surface of the lower sheet and on that portion of the overlapping upper sheet facing in the same direction as that face of the lower sheet. The segment was placed over a commercially available cigarette pack so that the coated portion of the upper sheet was adhered to the existing tear strip. Upon pulling the upper sheet away from the lower sheet, the menthol fragrance was emitted. Upon continued pulling of the upper sheet, the tear strip was engaged and the overwrap breached.

An alternative method of accomplishing a similar result would be to use a single sheet tear strip and apply a microcapsule bearing adhesive between said tear strip and the outer face of the inner package. This would form a tear strip that would rupture capsules when lifted from the surface of the container in a manner similar to that described in U.S. Pat. No. 4,487,801.

What is claimed is:

1. An article comprising an interior article, an overwrap, and a tear strip for opening said overwrap, said tear strip having two layers of material selected from the group consisting of polymeric film and paper secured by an adhesive layer associated with said tear strip, said two layers being in the form of
   (1) a tab to engage said tear strip or
   (2) the tear strip itself, the adhesive layer of said two layers of material containing frangible microcapsules having average diameters between 3 and 180 microns containing fragrance therein.
2. The article of claim 1 wherein the tear strip itself comprises two layers of material secured by an adhesive layer to said interior article.
3. The article of claim 1 wherein said interior article comprises a package of cigarettes.
4. The article having a wrapping material of claim 3 wherein both of said layers comprise a polymeric film.
5. The article having a wrapping material of claim 4 wherein said tear strip is adhered to said article by an adhesive tape.
6. The article having a wrapping material of claim 1 wherein said tear strip is adhered to said article by an adhesive layer.
7. An article having a wrapping material over it, said wrapping material having a tear strip associated therewith which when pulled is capable of tearing through said wrapping, said tear strip comprising two layers secured by an adhesive containing frangible microcapsules, said microcapsules having average diameters between 3 and 180 microns and releasing a fragrance when broken.
8. The article with a wrapping material over it of claim 7 wherein at least one of said two layers is a polymeric film.
9. The article having a wrapping material of claim 8 wherein said tear strip is adhered to said article by an adhesive tape.
10. The article having a wrapping material of claim 7 wherein said tear strip is further adhesively secured to said article.
11. The article having a wrapping material of claim 10 wherein said tear strip is adhered to said article by an adhesive tape.
12. The article having a wrapping material of claim 10 wherein said article is a package of cigarettes.
13. The article having a wrapping material of claim 12 wherein said tear strip is adhered to said article by an adhesive tape.
14. The article having a wrapping material of claim 7 wherein said article is a package of cigarettes.
15. The article having a wrapping material of claim 14 wherein said tear strip is adhered to said article by an adhesive tape.
16. The article having a wrapping material of claim 7 wherein said wrapping material is a transparent film.
17. The article having a wrapping material of claim 7 wherein said tear strip is adhered to said article by an adhesive tape.
18. An article comprising an interior article, an overwrap, and a tear strip for opening said overwrap having said tear strip secured by an adhesive layer to said interior article, the adhesive layer containing frangible microcapsules having average diameters of 3 to 180 microns containing fragrance therein.

* * * * *